United States Patent [19]
Lisec

[11] Patent Number: 5,823,732
[45] Date of Patent: Oct. 20, 1998

[54] DEVICE FOR MOVING INSULATING GLASS PANES

[76] Inventor: Peter Lisec, Bahnhofstrasse 34, A-3363 Amstetten-Hausmening, Austria

[21] Appl. No.: 724,919

[22] Filed: Oct. 2, 1996

[30] Foreign Application Priority Data

Oct. 13, 1995 [AT] Austria ..................................... 1700/95

[51] Int. Cl.[6] ........................................................ B65G 1/16
[52] U.S. Cl. ............................................. 414/278; 414/400
[58] Field of Search .............................. 414/22.68, 22.71, 414/278, 390, 392, 393, 395, 398, 400, 14; 198/836.1

[56] References Cited

U.S. PATENT DOCUMENTS

| | | | |
|---|---|---|---|
| 3,666,084 | 5/1972 | Stehl ................................ | 198/836.1 X |
| 4,274,792 | 6/1981 | Roth et al. ............................... | 414/564 |
| 4,422,541 | 12/1983 | Lisec ...................................... | 198/627 |
| 4,529,081 | 7/1985 | Tanaka ................................. | 414/278 X |
| 4,716,686 | 1/1988 | Lisec .................................. | 198/836.1 X |
| 5,209,627 | 5/1993 | Lisec ...................................... | 414/398 |
| 5,280,832 | 1/1994 | Lisec .................................. | 198/836.3 X |
| 5,332,080 | 7/1994 | Lenhardt et al. ................. | 198/836.1 X |
| 5,375,959 | 12/1994 | Trento ...................................... | 414/277 |
| 5,542,805 | 8/1996 | Lisec ...................................... | 414/280 |
| 5,688,097 | 11/1997 | Becker et al. ....................... | 414/392 X |

FOREIGN PATENT DOCUMENTS

| | | |
|---|---|---|
| 401 507 | 9/1996 | Austria . |
| 0 122 405 | 10/1984 | European Pat. Off. . |
| 0 538 233 | 4/1993 | European Pat. Off. . |
| 0 603 151 | 6/1994 | European Pat. Off. . |
| 2 449 222 | 9/1980 | France . |
| 2666079 | 2/1992 | France ..................................... 414/278 |
| 30 38 425 | 4/1982 | Germany . |
| 33 22 801 | 1/1985 | Germany . |
| 40 29 669 | 7/1991 | Germany . |
| 91 04 816.8 | 9/1991 | Germany . |
| 42 29 384 | 8/1997 | Germany . |
| 88719 | 4/1987 | Japan ..................................... 414/400 |
| 95/25688 | 9/1995 | WIPO . |

Primary Examiner—James W. Keenan
Attorney, Agent, or Firm—Young & Thompson

[57] ABSTRACT

To move sealed insulating glass panes (2) from a sealing device which has rollers (5) which can turn freely around essentially vertical axes and which are mounted on vertically adjustable beam (4), for supporting upper edge (7) of insulating glass pane (2), and which has conveyor device (3) which engages the lower edge of insulating glass pane (2) and which also guides insulating glass pane (2) laterally, into compartmented truck (8) which has several compartments (20) which are bounded by cord-like elements (19) which run preferably obliquely, there is jib (50) which projects freely over outlet-side edge (52) of the sealing device and on which there are rollers (51) which can turn freely around essentially vertical axes. Jib (50) is adjustable in the vertical direction (arrow 6). Rollers (28) with V-shaped peripheral surfaces which can turn around axes which run transversely to the conveyor direction and which are mounted on beam (40) or frame (45) are assigned to compartment (20) into which insulating glass pane (2) is to be pushed. Rollers (28) can be raised and lowered in order that they can be moved into an active position in which they are located higher than the supports which are provided in compartment (20) and which have V-shaped upper end surfaces, and into a readiness position in which they are located lower than the supports.

16 Claims, 3 Drawing Sheets

DEVICE FOR MOVING INSULATING GLASS PANES

BACKGROUND OF THE INVENTION

The invention relates to a device for moving insulating glass panes from a sealing device into a compartmented truck, the sealing device having rollers which can turn freely around essentially vertical axes and which are mounted on a vertically adjustable beam, for supporting the upper edge of an insulating glass pane, and having a conveyor device which engages the lower edge of the insulating glass pane and which also guides the insulating glass pane laterally, and the compartmented trucks having several compartments which are bounded by cord-like elements which run preferably obliquely.

DESCRIPTION OF THE RELATED ART

As the last step in the manufacture of insulating glass, insulating glass blanks are sealed, i.e., their edge joint is filled with sealing compound. Various devices have become known for sealing insulating glass panes. One device which has proven especially effective for transport of sealed insulating glass panes is known from DE-OS 30 38 425. This device has a beam which is provided with rollers and which abuts the insulating glass pane with its upper edge. The beam is vertically adjustable in height in order to adapt its position to the size of the insulating glass. The insulating glass pane is held underneath by hook-shaped carriers which are mounted on two continuous chains. These hooks reach underneath the insulating glass from the outside and leave the sealing joints free so that the sealing compound does not come into contact with the hooks.

For a long time sealed insulating glass panes have been taken from sealing devices using hoists which are equipped with suction heads, or simply by hand.

Compartmented trucks which have several rod-like or cord-like tensioned elements which run obliquely in a frame and which border the compartments are also known (EP-A 603 151). In these compartmented trucks, providing each compartment underneath with supports and assigning raisable and lowerable rollers to the compartments, rollers which are raised when a glass pane enters, are known so that the rollers are located higher than the supports provided underneath in the compartments.

For these compartmented trucks it is also known that the cord-like elements are equipped with pipe sections or sleeves which are pivotally located on the cord-like elements in order that glass panes cannot rub against the cord-like elements when pushed in, but can roll on the sleeves.

SUMMARY OF THE INVENTION

The object of the invention is to develop a device for sealing insulating glass panes such that the sealed insulated glass panes can be pushed simply into a compartmented truck which is set down next to the sealing device.

According to the invention it is provided for this purpose that there is a jib which projects over the outlet-side edge of the sealing device and on which there are rollers which can turn freely around essentially vertical axes, that the jib is adjustable in the vertical direction, and that in the compartment into which an insulating glass pane is to be pushed there are rollers with V-shaped peripheral surfaces which can turn around axes which run transversely to the conveyor direction, in which the rollers can be raised into an active position in which they project above supports provided in the compartment and can be lowered into a readiness position in which they are located lower than the supports.

With the arrangement according to the invention, sealed insulating glass panes, supported underneath by the conveyor means of the sealing device which engages the lower edge of the panes and at the top by the extension (jib) of the beam equipped with rollers, can be pushed preferably directly into one of the compartments of a compartmented truck. After this is done, the compartmented truck is adjusted transversely to the conveyance plane of the insulating glass panes such that the compartment to be fed next is aligned opposite the conveyance plane of the sealing device.

Each of the compartments of the compartmented truck can be equipped with raisable and lowerable, preferably freely rotating rollers which are preferably provided between fixed supports for insulating glass panes, or there is a single beam with rollers which is located in the conveyor plane of the insulating glass panes so that the beam equipped with rollers is aligned opposite the lower edge of the compartment which is to be supplied and which is aligned by moving the compartmented truck in the conveyance plane.

Preferably the rollers which are assigned to the lower edge of a compartment have V-shaped peripheral surfaces. Therefore the insulating glass panes simply with their outside edges stand on the flanks of the V-groove of the rollers and fresh sealing compound does not come into contact with the rollers.

In addition, the fixed supports which are assigned to each compartment of the compartmented truck are made V-shaped at the top in order that the sealing compound is not touched if an insulating glass pane stands in a compartment after the rollers have been lowered.

Alternatively, the arrangement with the beam and rollers for the compartmented truck can be mounted on a stand on which the compartmented truck which is to be supplied with insulating glass pane is set down. By adjusting the carrier for the compartmented truck it can be aligned opposite the conveyance plane of the sealing device. In this case the beam equipped with rollers, if there is only one beam, maintains its position opposite the conveyance plane of the sealing device so that it is always aligned opposite the compartment into which the insulating glass panes are to be pushed.

BRIEF DESCRIPTION OF THE DRAWINGS

Other details and features of the invention follow from the following description of one preferred embodiment.

DESCRIPTION OF THE PREFERRED EMBODIMENTS

Figure 1:
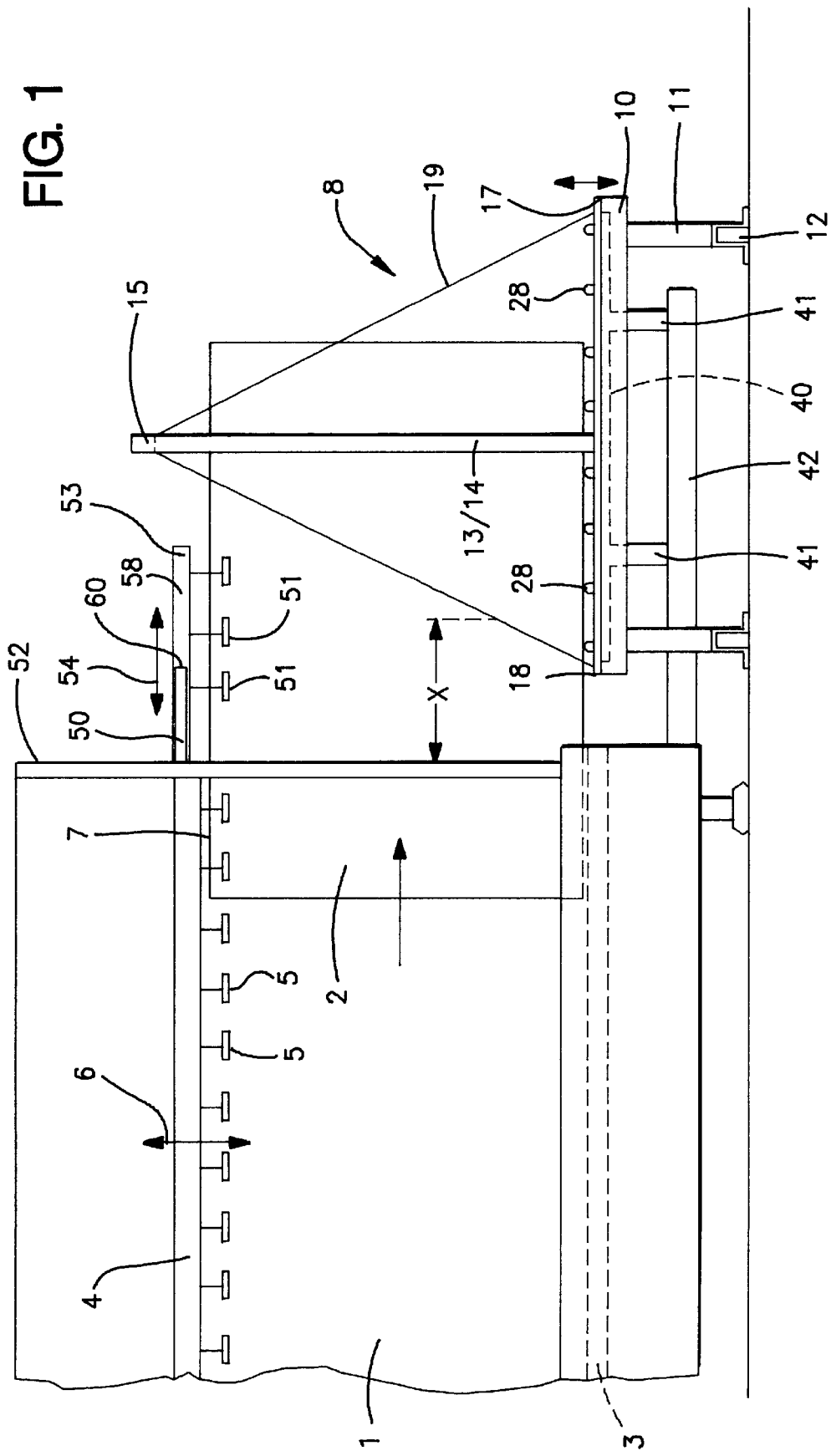
FIG. 1 shows schematically a side view of the outlet section of a sealing device for insulating glass panes with a compartmented truck set up next to it.

The sealing device can be made, especially in its outlet section which is shown in FIG. 1, as is known from DE-OS 30 38 425 or EP 538 233 A. The sealing device has machine frame 1 in which underneath there is conveyor device 3 which engages the lower edge of insulating glass pane 2. As a side support for insulating glass pane 2 there is beam 4 with freely turning rollers 5 which can be adjusted up and down in machine frame 1 (arrow 6) in order that rollers 5 can be aligned opposite upper edge 7 of insulating glass pane 2. Conveyor device 3 which engages the lower edge of insulating glass pane 2 in the sealing device, especially its outlet section, consists preferably of two continuous (roller) chains to which hooks are attached, with horizontal arms which point towards one another, and which fit under insulating glass panes 2 from the outside, but which do not touch the sealing compound. The hooks can be guided on guide rails on the machine frame and have pressure jaws which engage the outside surfaces of insulating glass pane 2.

Compartmented truck 8 which is shown in the embodiments in FIGS. 2 through 5 is set up next to outlet-side end 52 of the sealing device Compartmented truck 8 consists of bottom plate 10 which has feet 11 on its underside. Feet 11 can, as shown in FIG. 1, be equipped with rollers 12, in which at least some of rollers 12 can be made as guide rolls.

From bottom plate 10 vertical members 13 and 14 project upward and on their upper ends bear beam 15 which is aligned parallel to bottom plate 10.

Figure 3:
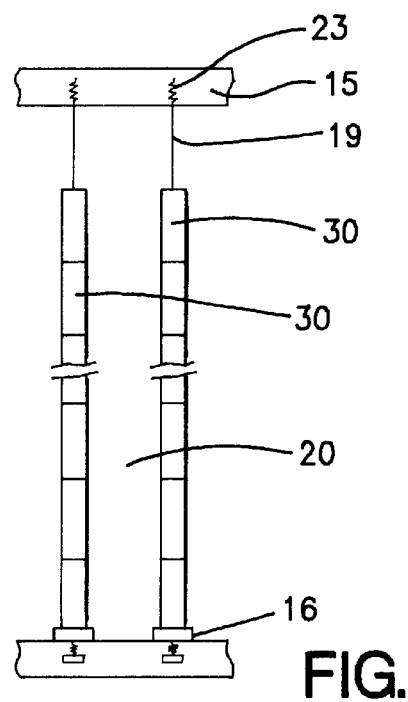
Figure 4:
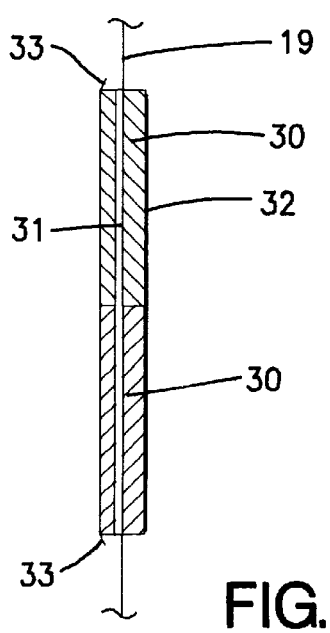

Between longitudinal edges 17 and 18 of bottom plate 10 and beam 15 rod-like or cord-like elements 19 are tensioned which between themselves form one compartment 20 at a time, into which insulating glass pane 2 can be inserted. As shown in FIGS. 3 and 4, pipe sections 30 which are detailed below are placed over rod-like or cord-like elements 19, as shown in FIGS. 3 and 4.

An embodiment is also possible in which rod-like or cord-like elements 19 are tensioned by beam 16 only to one side, i.e., towards longitudinal edge 18 of bottom plate 10. In this embodiment vertical members 13 and 14 are located preferably on one of the longitudinal edges of bottom plate 10, i.e. in two corners thereof.

Rod-like or cord-like elements 19 are for example steel cables which can be pretensioned by springs 23 and nuts, as is known from EP 477 163 A.

In the area of each compartment 20, on the top of bottom plate 10 there are supports 21 which can be bounded on either side by strips 22. Supports 21 have V-shaped top 24 so that insulating glass panes 2 which are placed in compartments 20 and which with their upper edge abut one or the other rod-like or cord-like element 19 which borders one compartment 20, rest only with their outside edges on supports 21.

Figure 2:
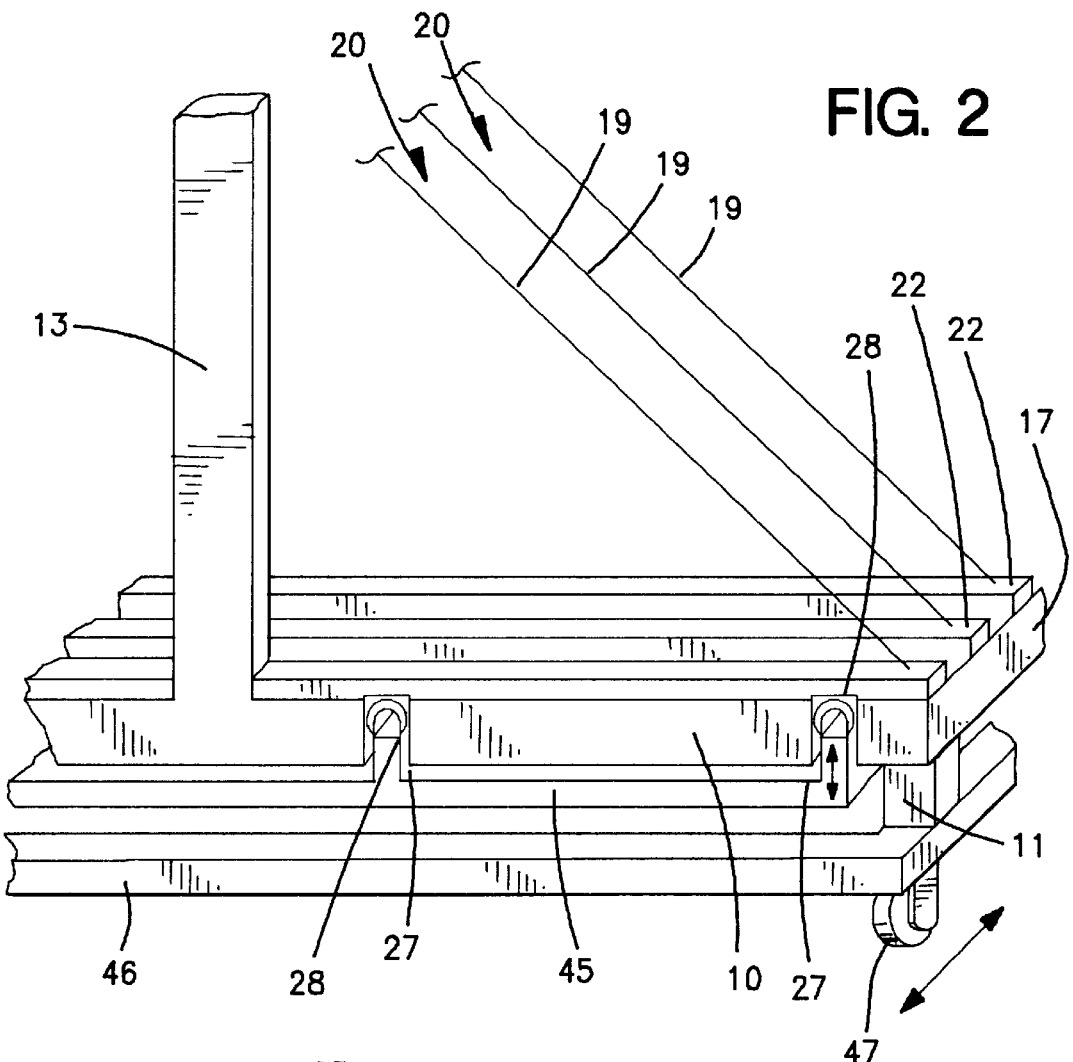
FIG. 2 shows a compartmented truck in a side view (detail) and FIGS. 3 through 5 show other details of the compartmented truck.
Figure 5:
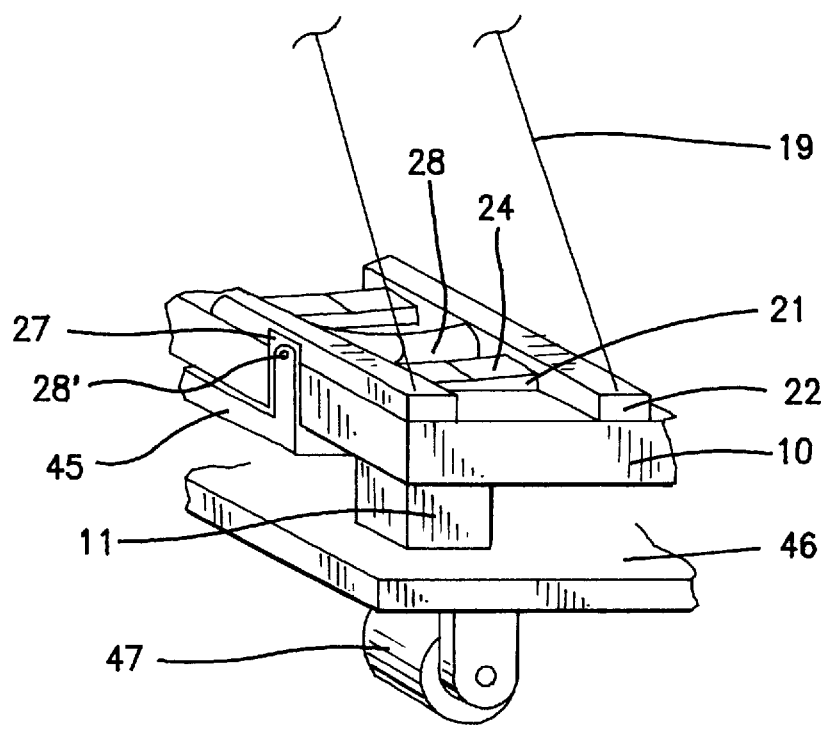

As is apparent from FIGS. 2 and 5, in bottom plate 10 there are recesses 27 which are open underneath, which run transversely to strips 22, and in which rollers 28 with V-shaped peripheral surface are held. Rollers 28 can be raised so high that they project above supports 21 so that insulating glass pane 2 can be conveyed into or out of compartments 20.

Rollers 28 are attached in the embodiment shown in FIG. 2 to frame 45 which can be adjusted via hydraulic cylinders relative to bottom plate 10 so that rollers 28 can be moved up and down.

In the embodiment shown in FIG. 1 rollers 28 are located on single beam 40. Rollers 28 turn around axes transversely to the longitudinal extension of beam 40. Beam 40 which is aligned in the extension of conveyor device 3 can be raised and lowered for example via hydraulic cylinders 41. Hydraulic cylinders 41 can be mounted on carrier 42 which can be moved in the conveyance direction.

The compartmented truck in FIGS. 2 and 5 stands with its feet 11 on base frame 46. Base frame 46 has castors 47, of which at least one pair can be made as guide rolls. In this way the device with compartments 20 can be moved by itself alone (FIG. 1) or via base frame 46 (FIG. 2) and can be positioned opposite upstream conveyor means 3 of the sealing device so that insulating glass panes 2 sorted according to any ordering criteria can be placed in compartments 20.

FIGS. 3 and 4 show rod-like or cord-like element 19, with cylindrical pipe sections 30 which are pushed over it and which were not shown in FIGS. 1 and 2, on an enlarged scale.

Pipe sections 30 have the shape of a sleeve with hole 31 and cylindrical outside jacket 32 and loosely abut one another via their face surfaces 33 which are aligned perpendicular to their longitudinal axis. Pipe sections 30 are made preferably of plastic.

Lowermost pipe section 30, as is shown in FIG. 3, rests on strip 22. Uppermost pipe section 30 is spaced from beam 15 and springs 23 at least as far as the lift of rollers 28.

When insulating glass pane 2 strikes or abuts pipe section 30 when it is pushed in or out, the latter can turn freely on its rod-like or cord-like element 19 so that it rolls on insulating glass pane 2 and is not cut or otherwise damaged by it.

If insulating glass pane 2 is raised by rollers 28, while it abuts with its upper edge 7 pipe section 30, this pipe section 30 together with all pipe sections 30 located over it are pushed upward without any relative movement which damages pipe sections 30 between the latter and insulating glass pane 2 and without hindering the lifting motion of insulating glass pane 2.

As is apparent from FIG. 5, rollers 28 which are located on axles 28' and on which insulating glass pane 2 is inserted into compartment 20 of compartmented truck 8 is equipped with a V-shaped peripheral surface so that the sealing compound which has not yet hardened at the time at which insulating glass pane 2 is inserted into compartmented truck 8 does not come into contact with the peripheral surface of rollers 28.

For this reason supports 21 on which insulating glass pane 2 stands are also made V-shaped at the top (surface 24) in compartmented truck 8.

Above outlet-side edge 52 of the sealing device, jib 50 protrudes which projects freely in the direction to compartmented truck 8 which is placed next to the sealing device. On jib 50 rollers 51 which turn freely around essentially vertical axes are supported. Jib 50 can be vertically adjusted together with beam 4 of the sealing device, is preferably made integral with the latter, or is rigidly joined to it.

Jib 50 can be made in an embodiment such that the distance of its free end 53 from outlet-side edge 52 of the sealing device can be changed. For this reason jib 50 consists of two or more parts which can be moved relative to one another, for example, telescoping parts. Jib 50 can also be mounted on machine frame 1 or preferably on beam 4 overall to move in the direction of double arrow 54 from FIG. 1. In an embodiment using telescoping parts, jib 50 can be extended from outlet-side edge 52 by withdrawing section 58 from overlap end 60.

It is a good idea if the projection of jib 50 above outlet side edge 52 of the sealing device is at least as large as distance "X" of rod-like or cord-like elements 19 of compartmented truck 8 from edge 52 of the sealing device at a height which corresponds to the height of the smallest of conventional insulating glass panes 2 (roughly 20 cm).

It is apparent that especially when transport device 3 which engages the lower end of the insulating glass pane is made as is known from DE-OS 30 38 425, jib 50 which projects above outlet-side edge 52 of the sealing device need not be so long that it extends into compartments 20 of compartmented truck 8, since insulating glass pane 2 is guided by conveyor device 3 which engages it underneath, and is adequately stabilized for example by hook-shaped supports and the pressure jaws assigned to them so that it is securely guided when boom 50 is only so long that it reaches to in front of one compartment 20 of compartmented truck 8. For compartments 20 which are formed by oblique, cord-like elements of compartmented truck 8, as are provided in compartmented truck 8 shown in the embodiment, it is enough if jib 50 is at least so long that it bridges the distance (section X in FIG. 1) of the nearest point of one cord-like element 19 at the height of smallest insulating glass pane 2 to be stacked to outlet-side edge 52 of the sealing device. This is because insulating glass pane 2, when inserted into the compartmented truck, is securely guided overhead by its cord-like elements 19 which are provided with freely turning sleeves 30 and underneath by V-shaped rollers 28.

In summary one embodiment of the invention can be described as follows:

To move sealed insulating glass panes 2 from a sealing device which has rollers 5 which can turn freely around essentially vertical axes and which are mounted on vertically adjustable beam 4, for supporting upper edge 7 of insulating glass pane 2, and which has conveyor device 3 which engages the lower edge of insulating glass pane 2 and which also guides insulating glass pane 2 laterally, into compartmented truck 8 which has several compartments 20 which are bounded by cord-like elements 19 which run preferably obliquely, there is jib 50 which projects freely over outlet-side edge 52 of the sealing device and on which there are rollers 51 which can turn freely around essentially vertical axes. Jib 50 is adjustable in the vertical direction (arrow 6). Rollers 28 with V-shaped peripheral surfaces which can turn around axes which run transversely to the conveyor direction and which are mounted on beam 40 or frame 45 are assigned to compartment 20 into which insulating glass pane 2 is to be pushed. Rollers 28 can be raised and lowered in order that they can be moved into an active position in which they are located higher than supports which are provided in compartment 20 and which have V-shaped upper end surfaces, and into a readiness position in which they are located lower than the supports.

I claim:

1. An improved device for moving insulating glass panes from a sealing device comprising, in combination:

a compartmented truck with compartments bounded by cord elements;

and a glass moving device adapted for mounting on said sealing device, said glass moving device having rollers for supporting an upper edge of an insulating glass pane, which rollers turn freely around substantially vertical axes and which are mounted on a vertically adjustable beam, and having a conveyor device which engages a lower edge of said insulating glass pane laterally and permits said insulating glass pane to move in a conveyance direction in a conveyor plane, the improvement comprising:

a jib which projects over an outlet-side edge of said sealing device;

jib rollers which turn freely around substantially vertical axes mounted on said jib;

said jib being adjustable in a vertical direction;

rollers having V-shaped peripheral surfaces which turn around axes running transversely to said conveyor direction, mounted in said compartments so that said insulating glass pane may be pushed thereupon;

supports mounted within said compartments for supporting said lower edge of said insulating glass pane; and means to raise said rollers having V-shaped peripheral surfaces into an active position in which they project above said supports and to lower said rollers having V-shaped peripheral surfaces into a readiness position in which they are located lower than said supports.

2. Device according to claim 1, wherein said supports (21) in the compartments have V-shaped upper end surfaces (24).

3. Device according to claim 1, wherein said rollers having V-shaped peripheral surfaces (28) are mounted on a roller beam (40) designed to be raised and lowered.

4. Device according to claim 3, wherein said roller beam (40) is rod-shaped and designed to be raised and lowered from a position located in the conveyor plane.

5. Device according to claim 4, wherein said roller beam (40) is mounted to be raised and lowered on a carrier (42) of a machine frame (1) of the sealing device.

6. Device according to claim 4, wherein said roller beam (40) can be withdrawn from an upper active position into a lower readiness position.

7. Device according to claim 1, wherein said jib (50) is designed to be raised and lowered synchronously with said beam (4) equipped with rollers (5).

8. Device according to claim 7, wherein said jib (50) is joined to said beam (4).

9. Device according to claim 1, wherein a distance of a free end (53) of said jib (50) from said outlet-side edge (52) of the sealing device is at least as large as a distance (X) of said cord elements (19) from said outlet-side edge (52).

10. Device according to claim 9, wherein said distance of the free end of the jib from said outlet-side edge is at least as large as a distance of said outlet-side edge (52) to said cord elements (19) at the height of the smallest insulating glass pane (2) for which said truck is designed to accommodate.

11. Device according to claim 1, wherein a distance of a free end (53) of said jib (50) from said outlet-side edge (52) is variable.

12. Device according to claim 11, wherein a length of said jib (50) is variable and said jib (50) comprises at least two parts which are designed to be moved relative to one another.

13. Device according to claim 11, wherein said jib (50) is designed to be moved relative to said beam (4) in the conveyance direction.

14. Device according to claim 1, wherein said rollers having V-shaped peripheral surfaces (28) are mounted on a frame (45) designed to be raised and lowered.

15. Device according to claim 14, wherein said frame is a grate-shaped or a grid-shaped frame (45) which is designed to be raised and lowered relative to said compartmented truck (8), and wherein said rollers having V-shaped peripheral surfaces (28) are mounted in several rows which are aligned opposite said compartments (20) of said compartmented truck (8).

16. Device according to claim 15, wherein said compartmented truck (8) to be loaded with insulating glass panes (2) further comprises a base upon which said frame is operatively mounted so that said frame is movable vertically relative to said base.

* * * * *